United States Patent
Kim (10) Patent No.: US 8,797,363 B2
(45) Date of Patent: *Aug. 5, 2014

(54) METHOD OF CONTROLLING TOUCH PANEL DISPLAY DEVICE AND TOUCH PANEL DISPLAY DEVICE USING THE SAME

(75) Inventor: Tae Hoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,418

(22) Filed: May 23, 2012

(65) Prior Publication Data

US 2012/0287069 A1 Nov. 15, 2012

Related U.S. Application Data

(63) Continuation of application No. 12/373,436, filed as application No. PCT/KR2007/000295 on Jan. 18, 2007.

(30) Foreign Application Priority Data

Jul. 13, 2006 (KR) .................. 10-2006-0065798

(51) Int. Cl.
*G09G 5/00* (2006.01)

(52) U.S. Cl.
USPC ........... 345/661; 345/660; 345/173; 345/156; 345/666

(58) Field of Classification Search
USPC ......... 345/660, 661, 666, 156, 157, 173, 501, 345/169, 179; 715/767, 765, 784, 849, 837; 725/41, 61
See application file for complete search history.

(56) References Cited

U.S. PATENT DOCUMENTS 5,615,384 A * 3/1997 Allard et al. .................. 345/660
6,121,960 A * 9/2000 Carroll et al. ................. 345/173

(Continued)

FOREIGN PATENT DOCUMENTS

CN 1263616 A 8/2000
CN 1770154 A 5/2006

(Continued)

OTHER PUBLICATIONS

Baudisch, Patrick et al. "Collapse-to-Zoom: Viewing Web Pages on Small Screen Devices by Interactively Removing Irrelevant Content",Proceedings of the 17th Annual ACM Symposium on User Interface Software and Technology, Santa Fe, NM, 4 pages, XP002462837, Oct. 24, 2004.

(Continued)

*Primary Examiner* — Chante Harrison
(74) *Attorney, Agent, or Firm* — Birch, Stewart, Kolasch & Birch, LLP (57) ABSTRACT

A method of controlling a touch panel display device, and which includes displaying a first display screen on the display device; receiving, via a controller of the touch panel display device and a touching signal indicating a touching action at a specific point on the first display screen; magnifying, via the controller, a predetermined area surrounding the specific point on the first display screen; displaying a second display screen including the magnified predetermined area with the specific point located at a center of the magnified predetermined area; receiving, via the controller, a selection signal indicating a selection of release touch icon displayed on the display device; and displaying the first display screen in response to the received selection signal.

16 Claims, 4 Drawing Sheets

(56) References Cited

U.S. PATENT DOCUMENTS

| | | | |
|---|---|---|---|
| 6,211,856 B1* | 4/2001 | Choi et al. | 345/666 |
| 7,336,263 B2* | 2/2008 | Valikangas | 345/173 |
| 7,376,907 B2* | 5/2008 | Santoro et al. | 715/765 |
| 7,492,350 B2* | 2/2009 | Fabre et al. | 345/156 |
| 8,042,044 B2* | 10/2011 | Van Leeuwen | 345/157 |
| 2002/0123368 A1 | 9/2002 | Yamadera et al. | |
| 2002/0149605 A1 | 10/2002 | Grossman | |
| 2004/0056837 A1* | 3/2004 | Koga et al. | 345/156 |
| 2004/0123320 A1 | 6/2004 | Daily et al. | |
| 2004/0212601 A1* | 10/2004 | Cake et al. | 345/173 |
| 2005/0140660 A1* | 6/2005 | Valikangas | 345/173 |
| 2005/0210399 A1* | 9/2005 | Filner et al. | 715/767 |
| 2006/0132460 A1 | 6/2006 | Kolmykov-Zotov et al. | |
| 2007/0152979 A1 | 7/2007 | Jobs et al. | |
| 2007/0159477 A1 | 7/2007 | Schrag et al. | |
| 2007/0176908 A1 | 8/2007 | Lipman et al. | |
| 2007/0198950 A1 | 8/2007 | Dodge et al. | |
| 2007/0205993 A1 | 9/2007 | Gloyd et al. | |
| 2007/0279315 A1* | 12/2007 | Laves et al. | 345/1.1 |
| 2008/0204476 A1* | 8/2008 | Montague | 345/661 |
| 2009/0128483 A1 | 5/2009 | Robbins et al. | |
| 2009/0128498 A1 | 5/2009 | Hollemans et al. | |
| 2009/0295830 A1 | 12/2009 | Muraveynyk et al. | |
| 2010/0021030 A1* | 1/2010 | Collins et al. | 345/501 |
| 2010/0093400 A1 | 4/2010 | Ju et al. | |
| 2011/0314501 A1* | 12/2011 | Vaysman et al. | 725/41 |
| 2011/0316887 A1* | 12/2011 | Fan | 345/661 |
| 2012/0056840 A1* | 3/2012 | Benko et al. | 345/173 |
| 2012/0124498 A1* | 5/2012 | Santoro et al. | 715/765 |
| 2012/0131453 A1* | 5/2012 | Pechanec et al. | 345/661 |
| 2012/0146930 A1* | 6/2012 | Lee | 345/173 |
| 2012/0176320 A1* | 7/2012 | Burrell, IV | 345/168 |
| 2012/0188285 A1* | 7/2012 | Friedlander et al. | 345/660 |
| 2013/0152013 A1* | 6/2013 | Forstall et al. | 715/784 |

FOREIGN PATENT DOCUMENTS

| | | |
|---|---|---|
| EP | 0476972 A2 | 3/1992 |
| EP | 0880090 A2 | 11/1998 |
| JP | 2003-233368 A | 8/2003 |
| KR | 2001-0092169 A | 10/2001 |
| KR | 10-2007-0078520 A | 8/2007 |
| WO | WO 99/54807 A1 | 10/1999 |
| WO | WO 2005/081893 A2 | 9/2005 |
| WO | WO 2005/124526 A2 | 12/2005 |
| WO | WO 2008/070815 A1 | 6/2008 |

OTHER PUBLICATIONS

Holmquist, Lars Erik, "The Zoom Browser Showing Simultaneous Detail and Overview in Large Documents", Internet Citation, pp. 1-12, XP002462982, Dec. 31, 1998.

Khella, Amir et al., "Pocket PhotoMesa: A Zoomable Image Browser for PDAs", International Conference on Mobile and Ubiquitous Mulitmedia, ACM, US, pp. 19-24, XP002462595, Oct. 29, 2004.

Malik, Shahzad et al., "Interacting with Large Displays from a Distance with Vision-Tracked Multi-Finger Gestural Input", pp. 43-52, XP002601890, Oct. 27, 2005.

Milic-Frayling, Natasa et al., "SmartView: Enhanced Document Viewer for Mobile Devices", Internet Citation, 10 pages, XP002462835, Nov. 30, 2002.

* cited by examiner

METHOD OF CONTROLLING TOUCH PANEL DISPLAY DEVICE AND TOUCH PANEL DISPLAY DEVICE USING THE SAME

CROSS-REFERENCE TO RELATED APPLICATIONS

This application is a Continuation of co-pending application Ser. No. 12/373,436 filed on Sep. 4, 2009, which is the national phase of PCT International Application No. PCT/KR2007/000295 filed on Jan. 18, 2007, and which claims priority to Application No. 10-2006-0065798 filed in the Republic of Korea on Jul. 13, 2006. The entire contents of all of the above applications are hereby incorporated by reference.

TECHNICAL FIELD

The present invention relates to touch panel display devices and more particularly to a method of controlling a touch panel display device using a zoom function.

BACKGROUND ART

A display device may be provided with a touch panel (also known as a touchscreen or touchscreen panel) as a user interface device enabling such operations as function selection and data input for a variety of apparatuses including personal computers. Such a touch panel display device may be provided in addition to or in lieu of the conventional input devices of a keyboard and mouse. Touch panels are suitable for a variety of applications where the display device itself may be used for system control or data entry, including retail settings such as point-of-sale systems (kiosks) and automated teller machines and in consumer electronics devices such as personal digital assistants and cellular telephones. Touch panels are essentially display overlays enabling the display device to display and receive information via the same screen, and conventional touch panels include many types, which are generally classified according to the methodology of the input, e.g., resistive, capacitive, surface wave, infrared, strain gauge, optical imaging, and acoustic pulse recognition. Each of these permits a stimuli that registers as a touch event.

For example, a resistive system registers a touch event whenever two resistive layers make contact, such that the stimulus may be any solid object, e.g., a human finger or a pencil eraser. A capacitive system, on the other hand, must have a conductive input, which is most typically supplied by a user's finger. The surface wave system, operating like the resistive system but using ultrasonic waves that pass over the touch panel, allows a touch event to be registered using any object that can effectively disturb the waves.

Touch panels are typically assembled together with the screen of a general display device, to operate in conjunction with touch driver software installed in the display device, i.e., pre-stored in its memory, to assign a function to each of a predetermined set of icons (or windows) acting as input keys arranged according to screen coordinates. A touch event for a currently displayed icon causes a corresponding operation, e.g., program execution or data entry. In other words, the touch driver serves as an interface with the personal computer and effectively executes in turn an operation for each touched icon (touch event). In doing so, a controller of the display device recognizes the coordinates of the touched icon, whereby a corresponding image is displayed on the touch panel's screen in response to a signal generated by the touch driver.

In many touch panel applications, user operation can be facilitated by displaying a minimum number of icons, which is disadvantageous since fewer icons places undesirable limits on the functionality of a system using a touch panel display device. To increase the number of simultaneously displayed icons for a given display device, however, icon size should be reduced, which exacerbates user operation and tends to contribute to inputting errors. In particular, icons may become too small for a consistent and accurate manipulation by a human finger, in which case the system experiences difficulty in recognizing a particular touch event as desired. Meanwhile, touch panel manufacturers report a 1.5% error rate in the specified screen dimensions in monitors and other display devices, which inhibits software design and application. Accordingly, contemporary touch panel display devices are disadvantageous in that selection and manipulation of a specific icon (currently displayed key) becomes more difficult, such that multiple attempts by a user may be required for smaller icons or icons that are unfavorably arranged, e.g., near an edge or in a corner of the screen where display accuracy may be degraded.

DISCLOSURE OF INVENTION

Accordingly, the present invention is directed to a method of controlling a touch panel display device and a touch panel display device using the same that substantially obviate one or more of the problems due to limitations and disadvantages of the related art.

An object of the present invention is to provide a method of controlling a touch panel display device and a touch panel display device using the same, by which a touch event for a specific icon can be facilitated.

Another object of the present invention is to provide a method of controlling a touch panel display device and a touch panel display device using the same, which improves the reliability of registering a touch event for a specific icon.

Another object of the present invention is to provide a method of controlling touch panel display device and a touch panel display device using the same, which simplifies the operation of a zoom function by a user.

Another object of the present invention is to provide a method of controlling touch panel display device and a touch panel display device using the same, which enables smaller icons to be used in a touch driver and arranged as desired.

Another object of the present invention is to provide a method of controlling touch panel display device and a touch panel display device using the same, which enables a compensation for larger errors in screen dimensions, thereby permitting greater flexibility in applying a specific touch driver across a wide range of manufactured display devices.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, there is provided a method of controlling a touch panel display device. The method comprises steps of displaying a zoom icon area on at least part of a screen made up of a plurality of coordinates; recognizing coordinates of a touch event, to determine whether the touch event corresponds to the displayed zoom icon area; and displaying, if it is determined that the touch event corresponds to the displayed zoom icon area, a magnified icon area corresponding to the zoom icon area. The touch event may consist of a predetermined number of touches, i.e., one touch or two touches, occurring within the zoom icon area and executed by a user manipulating a touch panel of the touch panel display device, wherein the magnified icon area is displayed according to a count of the touches executed by the user.

To further achieve these and other advantages and in accordance with the purpose of the present invention, there is provided a touch panel display device comprising a touch panel exhibiting a plurality of coordinates corresponding to a screen area of the touch panel display device, the screen area including a zoom icon area; a touch panel controller for recognizing coordinates of a touch event, for storing the recognized coordinates in an internally provided memory, and for outputting a coordinates signal corresponding to the touch event by converting a value generated by the touch event into a corresponding coordinates value; a microprocessor for determining whether the coordinates value output from the touch panel controller corresponds to the zoom icon area of the screen area; a touch driver for outputting a zoom function signal corresponding to the coordinates value output from the touch panel controller; and a display for displaying a magnified icon area corresponding to the zoom icon area, if the microprocessor determines that the coordinates value output from the touch panel controller corresponds to the zoom icon area of the screen area.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiment(s) of the invention and together with the description serve to explain the principles of the invention. In the drawings.

BEST MODE FOR CARRYING OUT THE INVENTION

Figure 1:
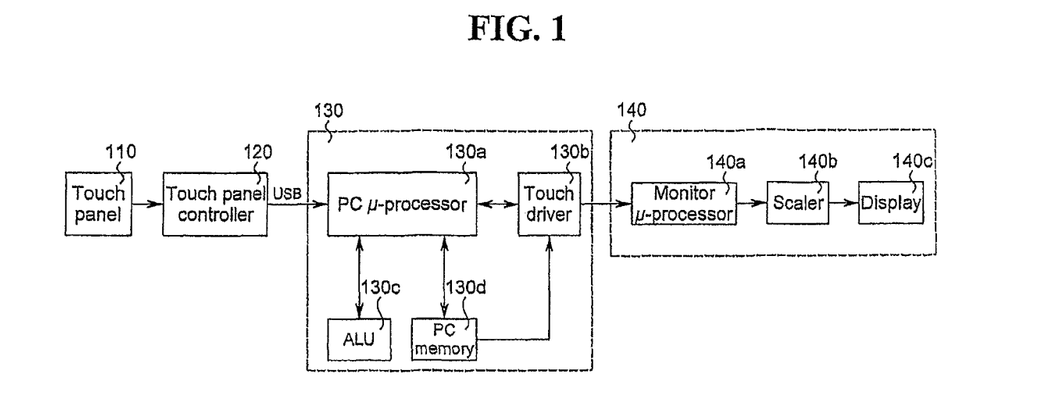
FIG. 1 is a block diagram of a touch panel display device according to the present invention.

Referring to FIG. 2, a touch panel display device according to the present invention includes a touch panel 110 exhibiting a plurality of coordinates corresponding to a full screen area and enabling a touch event at any point on the screen; a touch panel controller 120 for recognizing the coordinates of the touch event, and particularly the coordinates of a touched icon, storing the recognized coordinates in an internally provided memory, e.g., an EEPROM (not shown), and outputting a coordinates signal corresponding to the touch event by converting a value, e.g., an analog voltage of 0V-5V, generated by the touch event into a corresponding coordinates value; a personal computer (PC) 130 including a PC microprocessor 130a, a touch driver 130b, an arithmetic logic unit (ALU) 130c, and a PC memory 130d; and a monitor 140 including a monitor microprocessor 140a, a scaler 140b, and a display 140c having a screen (not shown). The universal serial bus (USB) may be substituted with an RS-232C or similar communication line for interfacing the PC microprocessor 130a with the touch panel controller 120, which may be integrated with the touch panel 110, and there may be one or more interface units (not shown) separately provided for interfacing with internal blocks of the personal computer 130.

It should be appreciated that, rather than the personal computer 130 of the present invention may be part of an ordinary computing system such as a point-of-sale terminal or automated teller machine or may comprise the microprocessor-related elements of a consumer electronics device such as a personal digital assistant, cellular telephone, or other device having a general display device that may be provided with a touch panel; meanwhile, the monitor 140 of the present invention is essentially a corresponding general display device. It should be further appreciated that, since display coordinates of the display 140c should correspond to the plurality of coordinates of the touch panel 110, the touch panel is typically assembled together with the screen of the above general display device, i.e., the monitor 140.

The touch driver 130b, which is essentially a software package loaded into the personal computer 130, and more, specifically, into the PC memory 130d, generates a zoom function signal corresponding to the coordinates value signal output from the touch panel controller 120. Besides general control signals associated with the loaded software of the touch driver 130b, the zoom function signal may be a control signal for magnifying (zooming in on) an area displaying a specific set of icons, graphics user interface (GUI) elements, or other images of a defined area of the screen. The touch driver 130b basically performs a coordinates correcting function, or coordinates value calibration, to convert a signal indicating a screen position (point) selected by the user into a mouse click input of the personal computer 130.

In addition to the touch driver software, the PC memory 130d stores a set of original coordinates corresponding to the physical dimensions of the screen of the display 140c and, indirectly, to the coordinates of the touch panel 110. When a zoom function signal is generated, a set of magnified coordinates values corresponding to the original coordinates are also stored in the PC memory 130d. Thus, the zoom function signal output by the touch driver 130b uses the stored original coordinates to generate the magnified coordinates values.

The touch driver 130b recognizes, based on the coordinates of a touch event, registration information corresponding to a touched icon and outputs a control signal to the monitor 140. As stated previously, the control signal may be a zoom function signal, generated under control of the PC microprocessor 130a and ALU 130c, to control the display of a magnified icon area in response to a touch event of the zoom icon area and to define the resolution and size, i.e., scaling, of the new icon area. It should be appreciated that the touch event occurring in the zoom icon area may be based on a single entry point (i.e., one touch by the user) or based on two separate entry points (i.e., two touches by the user), where each entry point corresponds to a touch event occurring anywhere in the zoom icon area. That is, according to the values of the coordinates of the touch event, the touch driver 130b recognizes the input of an icon zooming signal, which is essentially supplied by a user operating the touch panel display device of the present invention, as a user selection signal for selecting a magnified icon area.

Thereafter, the scaler 140b performs a scaling operation in accordance with the zoom function signal output by the touch driver 130b and controls the display 140c according to a scaling operation performed with respect to a portion of the zoom icon area using the recognized coordinates of the touch event. The scaler 140b may be included in the personal computer 130 rather than the monitor 140, or the personal computer may be separately provided with such a scaler, so that scaling operations may be performed in conjunction with the PC microprocessor 130a rather than the monitor microprocessor 140a.

The display 140c displays on its screen an image in response to the control signals, including the zoom function signal, output by the touch driver 130b. The displayed image may be magnified (scaled) under control of the scaler 140b. Thus, the display 140c may initially display a zoom icon area covering at least part of the full screen area and may, in response to a zoom function signal, otherwise display a magnified icon area corresponding to the zoom icon area, such that the magnified icon area covers a greater part of the full screen area.

Figure 2A:
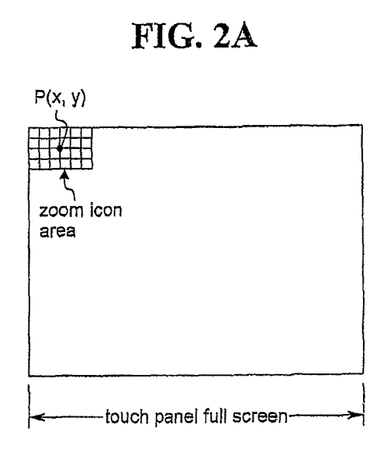
FIGS. 2A and 2B are exemplary diagrams of an arrangement of icons displayed on the screen of a touch panel display device according to a first embodiment of the present invention, respectively illustrating the states of a touch panel full screen before and after execution of a zoom function based on one entered point.
Figure 2B:
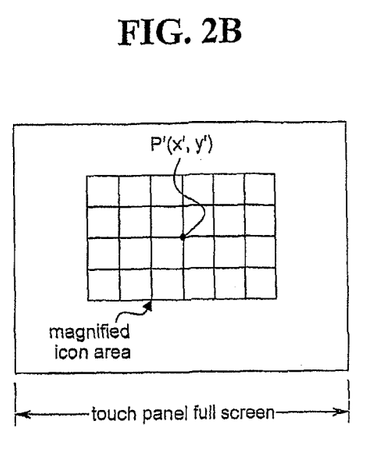
Figure 2C:
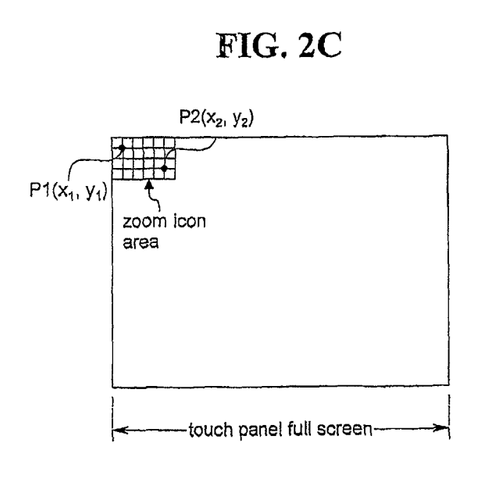
FIGS. 2C and 2D are exemplary diagrams of an arrangement of icons displayed on the screen of a touch panel display device according to a second embodiment of the present invention, respectively illustrating the states of a touch panel full screen before and after execution of a zoom function based on two entered points.
Figure 2D:
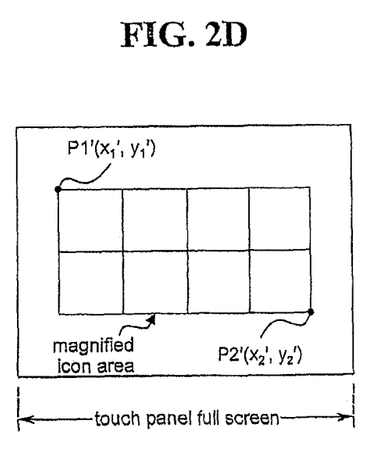

FIGS. 2A-2D illustrate operation of a touch panel display device adopting the present invention. Here, operation according to a first embodiment is demonstrated by a screen display as in FIG. 2B relative to FIG. 2A, and operation according to a second embodiment is demonstrated by a screen display as in FIG. 2D relative to FIG. 2C. That is, in each of FIGS. 2A and 2C, a set of icons is arranged in a zoom icon area before execution of a zoom function, where the remainder of the screen may display an image, as desired, in accordance with the loaded software and normal operation of the touch driver 130b. In each case, a magnified icon area may be displayed according to a user selection of touched points within the zoom icon area, that is, after zoom function execution according to the first or second embodiment. For example, FIG. 2B shows a magnified icon area displayed as a result of zoom function execution based on one entered point, i.e., P(x, y) of FIG. 2A, and FIG. 2D shows a magnified icon area displayed as a result of zoom function execution based on two entered points, i.e., $P1(x_1, y_1)$ and $P2(x_2, y_2)$ of FIG. 2C. Accordingly, in each of FIGS. 2B and 2D, the original icon area (zoom icon area) is redisplayed in a magnified state (magnified icon area) by a predetermined scaling operation in response to the user selection of one or more touched points within the zoom icon area.

In FIG. 2A, a zoom icon area is arranged an upper left region of the screen as a block of coordinates corresponding to a set of icons. Upon recognition of a touch event within the zoom icon area, a specific region of the zoom icon area is magnified (scaled) and displayed as in FIG. 2B, to facilitate user recognition of the icons of the zoom icon area and thereby facilitate a quick and accurate selection of a specific icon. Display of the magnified icon area may be achieved by redisplaying the icons of the zoom icon area, centered on coordinates (x, y) of the touched point, and then magnifying the zoom icon area by a prescribed distance, say, ±3 cm, with respect to each coordinate. The PC microprocessor 130a may determine values of new coordinates corresponding to a magnified resolution by multiplying the touched coordinates, i.e., (x, y), by a numerical value to define a magnified icon area based on the new coordinates and generate a scaling control signal for the magnified icon area thus defined. The touch driver 130b outputs the scaling control signal to the monitor 140, where the scaler 140b redefines the original icon area according to the scaling control signal, resulting in an icon area magnification according to a defined resolution and size, and then outputs a corresponding display signal (control signal) to the display 140c, which displays the magnified icon area on a predetermined screen position, for example, a central position. The newly defined magnified icon area is shown in FIG. 2B, including a newly defined point P'(x', y') corresponding to a single touched point at P(x, y). That is, in the first embodiment, the touch event recognized by the touch panel controller 120 as a touch event initiating an icon zooming signal includes one point entered by a user manipulating (touching) the touch panel 110.

In FIG. 2C, a zoom icon area is similarly arranged, and a specific region of the zoom icon area is redisplayed as in FIG. 2D upon recognition of a touch event within the zoom icon area. In this case, display of the magnified icon area is achieved by redisplaying the zoom icon area between coordinates $(x_1, y_1)$ and $(x_2, y_2)$ of the touched points, using the scaling control signal output by the touch driver 130b to scale the zoom icon area based on a distance between the coordinates. The PC microprocessor 130a may determine values of new coordinates in a manner similar to that described with respect to the first embodiment, to define a magnified icon area as in FIG. 2D, including a pair of newly defined points $P1'(x_1', y_1')$ and $P2'(x_2', y_2')$ corresponding to the touched points $P1(x_1, y_1)$ and $P2(x_2, y_2)$, respectively. That is, in the second embodiment, the touch event recognized by the touch panel controller 120 as a touch event initiating an icon zooming signal includes two points entered by a user manipulating (touching) the touch panel 110.

Figure 3:
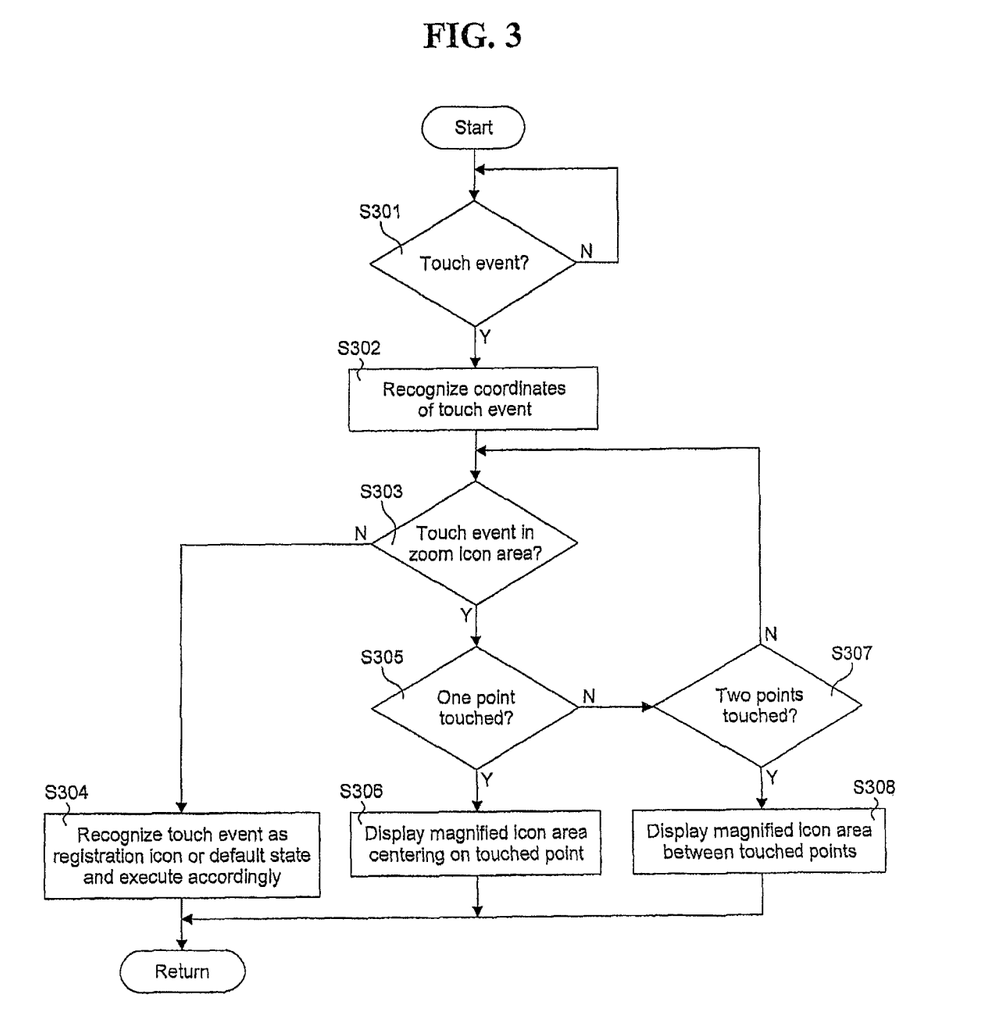
FIG. 3 is a flowchart of a process of displaying a magnified icon area according to the method of the present invention.

Referring to FIG. 3, illustrating the displaying of a magnified icon area according to the method of the present invention, the PC microprocessor 130a first determines whether there is a touch event, which may result in a user selection of any one of a plurality of icons displayed by the display 140c and made accessible through the touch panel 110 (S301), and if so, the touch panel controller 120 recognizes the coordinates of the touch event (S302). Based on the obtained value of the touch event coordinates, it is then determined whether the touch event occurred in a zoom icon area (S303), and if not, the PC microprocessor 130a processes the touch event normally, for example, by regarding the touched icon as another icon to which registration information has been assigned or simply as a default state operation, and then recognizes and executes the touch event accordingly (S304).

If, on the other hand, the touch event did occur in the zoom icon area, the PC microprocessor 130a determines whether the touch event is meant as part of a one-point-entry zoom function (FIGS. 2A and 2B) or as the first entry point for executing a two-point-entry zoom function (FIGS. 2C and 2D). In cases where a method of controlling a touch panel display device enables both the first and second embodiments of the present invention, this determination may be achieved by way of a wait period (delay) followed by a lock-out time, where the PC microprocessor 130a waits a predetermined time, say, 500 milliseconds, from entry of a first point before displaying the magnified icon area according to the first embodiment (S305, S306), after which entry of a second point would be locked out, but immediately displays the magnified icon area according to the second embodiment if a second point is timely entered (S307, S308). Meanwhile, in cases where the present invention applies only to the first or second embodiment, i.e., separately, the microprocessor programming may cause an immediate display of the magnified icon area upon input of the anticipated entry points to the touch panel 110. After execution of one of the steps S306 or S308, the PC microprocessor 130a may proceed to execution of the process of FIG. 4.

Figure 4:
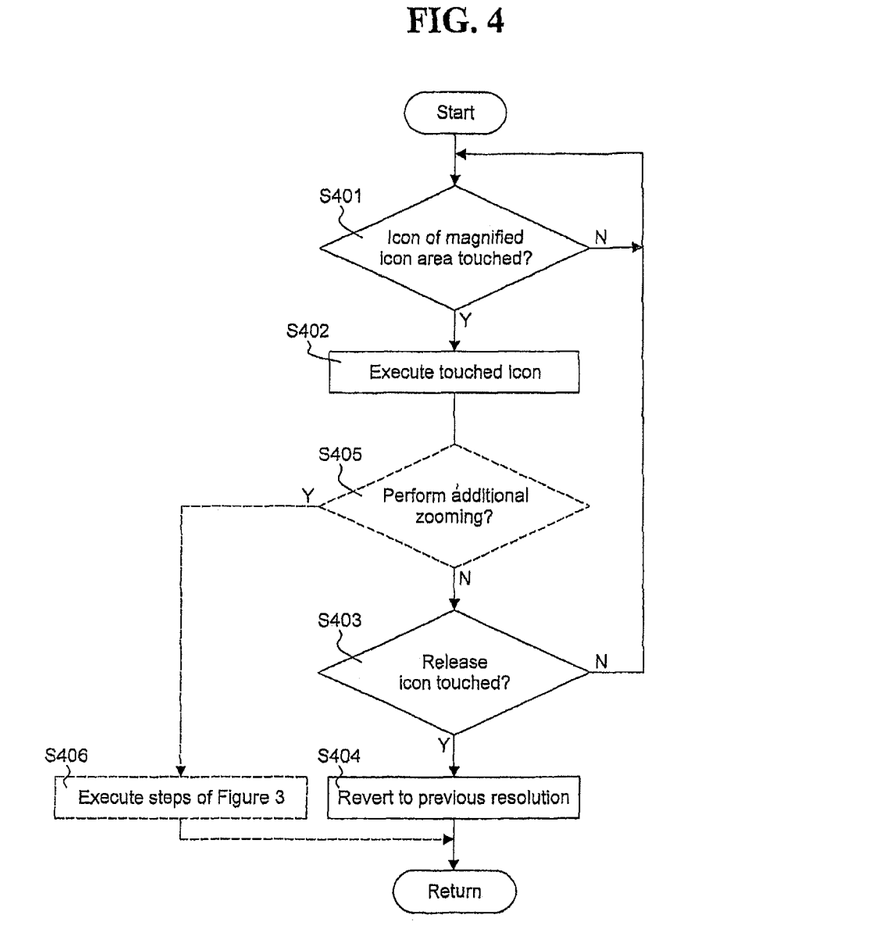
FIG. 4 is a flowchart of a process of executing a touched icon of a magnified icon area according to the method of the present invention.

Referring to FIG. 4, illustrating the execution of a touched icon of a magnified icon area according to the method of the present invention, the PC microprocessor 130a first determines whether there is a user selection, i.e., touch, of an icon of the magnified icon area (S401). To determine which icon of the magnified icon area is selected, coordinates corresponding to the currently displayed positions of icons, including icons of the magnified icon area, are stored in the PC memory 130d along with a system program equating the current function of each icon of the magnified icon area to its corresponding function for the original (or previous resolution) icon area, e.g., the zoom icon area of FIG. 2A or 2C. If it is determined that a specific icon of the magnified icon area has been selected (touched), the PC microprocessor 130a executes the corresponding icon function, namely, the function of the corresponding icon of the original icon area (S402). Subsequently, it is determined whether a release icon is touched or whether one or more further icon selections of the magnified icon area are to be made via the steps S401 and S402 (S403). The release icon, which may be located within the magnified icon area or elsewhere on the screen, returns the magnified icon area to the original icon area, e.g., the zoom icon area, by reverting to the previous resolution or recovering the original resolution (S404).

Meanwhile, once a level of magnification has been determined through a zoom function operation achieved by the first or second embodiment, i.e., based on entry of one point or two points, additional zooming (icon area magnification) may be performed according to the process of FIG. 3 (S405, S406). This additional zooming may be necessary in the event of very small icons in very high resolution environments and may be executed using a secondary zoom icon area displayed within the first magnified icon area based on a set of magnified coordinates, and one or more further zooming operations (cycles) may be additionally achieved by executing further iterative processes.

INDUSTRIAL APPLICABILITY

By adopting the present invention, application of a touch panel display device can be extended by enabling increased reliability of usage by general consumers. In doing so, user errors can be reduced even for small icons in high-resolution (e.g., 1600×1200) environments, thereby facilitating smaller icon usage. In addition, software designs may more easily account for the inherent error rate (e.g., 1.5%) in screen dimensions exhibited by a display device adopting the present invention, which may be manufactured with minute variations in screen dimensions and which may exhibit degraded display accuracy at the extremes of the screen. Though a personal computer is taken as an example of an application of a display device adopting the present invention, the present invention is applicable to other display devices having or using a touch panel.

While the present invention has been described and illustrated herein with reference to one or more preferred embodiments, it will be apparent to those skilled in the art that various modifications can be made in the present invention without departing from the spirit or scope of the invention. Thus, it is intended that the present invention covers such modifications provided they come within the scope of the appended claims and their equivalents.

The invention claimed is:

1. A method of controlling a touch panel display device, the method comprising:
displaying a first display screen on the display device, said first display screen being a partial portion of a full screen of the display device;
receiving, via a controller of the touch panel display device, a first touching signal indicating a touching on the first display screen;
magnifying, via the controller, a predetermined area surrounding a specific point touched on the first display screen;
displaying a second display screen including the magnified predetermined area with the specific point, wherein the magnified predetermined area is shifted toward a central portion of the display device, and wherein the specific point is highlighted within the magnified predetermined area;
receiving, via the controller, a release selection signal requesting a release of the magnification of the predetermined area;
displaying the first display screen in response to the received release selection signal,
wherein the touching of the specific point on the first display screen is a random specific point selected by a user, and
wherein the second display screen including the magnified predetermined area is larger than the first display screen;
receiving a second touching signal indicating a touching of an icon on an area of the display device that is outside the first display screen; and
executing a function corresponding to the touching of the icon on the area outside the first display screen.

2. The method of claim 1, further comprising:
recognizing, via the controller, coordinates of the specific point on the display device.

3. The method of claim 1, wherein the specific point is on an icon displayed in the first display screen.

4. A touch panel display device, comprising:
a display configured to display a first display screen, said first display screen being a partial portion of a full screen of the display device; and
a controller configured to:
receive a first touching signal indicating a touching on the first display screen,
magnify a predetermined area surrounding a specific point touched on the first display screen,
control the display to display the magnified predetermined area with the specific point,
wherein the magnified predetermined area is shifted toward a central portion of the display device,
wherein the specific point is highlighted within the magnified predetermined area,
wherein the touching of the specific point on the first display screen is a random specific point selected by a user, and
wherein the magnified predetermined area is larger than the first display screen,
receive a second touching signal indicating a touching of an icon on an area of the display device that is outside the first display screen, and
execute a function corresponding to the touching of the icon on the area outside the first display screen.

5. The display device of claim 4, wherein the controller is further configured to recognize coordinates of the specific point on the display device.

6. The display device of claim 4, wherein the specific point is on an icon displayed in the first display screen.

7. The display device of claim 4, wherein the controller is further configured to:
receive a release selection signal requesting a release of the magnification of the predetermined area, and
control the display to display the first display screen in response to the release received selection signal.

8. A method of controlling a touch panel display device, the method comprising:
displaying a first display screen on the display device, said first display screen being a partial portion of a full screen of the display device;
receiving, via a controller of the touch panel display device, a double touching signal indicating a double touching action at first and second specific points on the first display screen;
magnifying, via the controller, a predetermined area if the second specific point is touched within a predetermined time after the first specific point is touched, wherein the magnifying step magnifies the predetermined area in proportion to a distance between the first and second specific points;
displaying a second display screen including the magnified predetermined area, wherein the magnified predetermined area is shifted toward a central portion of the display device;
receiving, via the controller, a release selection signal requesting a release of the magnification of the predetermined area;
displaying the first display screen in response to the received release selection signal,
wherein the touching action of the specific point on the first display screen is a random specific point selected by a user, and
wherein the second display screen including the magnified predetermined area is larger than the first display screen;
receiving a second touching signal indicating a touching of an icon on an area of the display device that is outside the first display screen; and
executing a function corresponding to the touching of the icon on the area outside the first display screen.

9. The method of claim 8, further comprising:
recognizing, via the controller, coordinates of the specific first and second points on the display device.

10. The method of claim 8, wherein the first and second points are highlighted within the magnified predetermined area.

11. The method of claim 8, wherein the magnifying step magnifies the predetermined area to be defined by a boundary defined by the first and second specific points.

12. A touch panel display device, comprising:
a display configured to display a first display screen, said first display screen being a partial portion of a full screen of the display device; and
a controller configured to:
receive a double touching signal indicating a double touching action at first and second specific points on the first display screen,
magnify a predetermined area if the second specific point is touched within a predetermined time after the first specific point is touched, and magnify the predetermined area in proportion to a distance between the first and second specific points,
display a second display screen including the magnified predetermined area, wherein the magnified predetermined area is shifted toward a central portion of the display device,
receive a release selection signal requesting a release of the magnification of the predetermined area,
display the first display screen in response to the received release selection signal,
wherein the touching action of the specific point on the first display screen is a random specific point selected by a user, and
wherein the second display screen including the magnified predetermined area is larger than the first display screen,
receive a second touching signal indicating a touching of an icon on an area of the display device that is outside the first display screen, and
execute a function corresponding to the touching of the icon on the area outside the first display screen.

13. The display device of claim 12, wherein the controller is further configured to recognize coordinates of the specific first and second points on the display device.

14. The display device of claim 12, wherein the first and second points are highlighted within the magnified predetermined area.

15. The display device of claim 12, wherein the controller is further configured to magnify the predetermined area to be defined by a boundary defined by the first and second specific points.

16. A touch panel display device, comprising:
a display configured to display on a screen a zoom icon area with a set of icons arranged in the zoom icon area; and
a controller configured to:
recognize a first touch event;
perform a double determining processes after the first touch event is recognized, and including a first determining process of determining whether the recognized first touch event is positioned within the zoom icon area, and a second determining process of determining whether or not the recognized first touch event corresponds to a one point-touch if the recognized first touch event is positioned within the zoom icon area;
execute a function of a single icon without magnifying the zoom icon area if the recognized first touch event is positioned out of the zoom icon area;
if the recognized first touch event corresponds to the one point-touch, display a magnified icon area corresponding to the zoom icon area, wherein the magnified icon area is larger than the zoom icon area and the magnified icon area includes all of the icons arranged within the zoom icon area regardless of a position of the recognized first touch event in the zoom icon area;
recognize a second touch event;
determine whether the recognized second touch event corresponds to a remainder of the screen; and
return to displaying the zoom icon area without displaying the magnified icon area if it is determined that the recognized second touch event corresponds to the remainder of the screen while the magnified icon area is displayed.

* * * * *